United States Patent
Gauch et al.

(10) Patent No.: US 11,440,136 B2
(45) Date of Patent: Sep. 13, 2022

(54) METHOD AND DEVICE FOR SHAPING RADIATION FOR LASER PROCESSING

(71) Applicant: Robert Bosch GmbH, Stuttgart (DE)

(72) Inventors: Roland Gauch, Renningen (DE); Dmitriy Mikhaylov, Renningen (DE); Tobias Graf, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 330 days.

(21) Appl. No.: 16/491,371

(22) PCT Filed: Mar. 2, 2018

(86) PCT No.: PCT/EP2018/055206
§ 371 (c)(1),
(2) Date: Sep. 5, 2019

(87) PCT Pub. No.: WO2018/162356
PCT Pub. Date: Sep. 13, 2018

(65) Prior Publication Data
US 2020/0070280 A1    Mar. 5, 2020

(30) Foreign Application Priority Data

Mar. 7, 2017    (DE) .................... 10 2017 203 655.9

(51) Int. Cl.
*B23K 26/06*    (2014.01)
*B23K 26/067*    (2006.01)
(Continued)

(52) U.S. Cl.
CPC ............ *B23K 26/06* (2013.01); *B23K 26/064* (2015.10); *B23K 26/0622* (2015.10);
(Continued)

(58) Field of Classification Search
CPC .. B23K 26/06; B23K 26/0622; B23K 26/064; B23K 26/0626; B23K 26/0673; B23K 26/073; B23K 26/0676; G02B 27/0944
See application file for complete search history.

(56) References Cited

U.S. PATENT DOCUMENTS 6,008,914 A * 12/1999 Sasagawa .......... B23K 26/0604
359/15
6,577,429 B1    6/2003 Kurtz et al.
(Continued)

FOREIGN PATENT DOCUMENTS

DE    102007029621 A1    1/2009
DE    102010052950 A1    3/2012
(Continued)

OTHER PUBLICATIONS

Machine translation of JP-05104276-A, Sep. 2021.*
International Search Report for PCT/EP2018/055206, dated Jun. 15, 2018.

*Primary Examiner* — Geoffrey S Evans
(74) *Attorney, Agent, or Firm* — Norton Rose Fulbright US LLP; Gerard Messina

(57) ABSTRACT

A method and a laser assemblage are described for material processing, such that in a laser assemblage, a laser beam is focused onto a processing/imaging plane and the laser beam can be adapted in terms of its intensity distribution by way of at least one beam shaper. Provision is made in this context that in order to avoid uniformity defects in the processing/imaging plane, the laser beam is split by way of at least one beam splitter into at least two partial or individual beams, and the partial or individual beams are differently influenced, or each partial or individual beam is constituted from a laser source having a different wavelength, in such a way that after they are combined and focused onto the processing/imaging plane they form an output beam having an intensity profile, adjacent intensity maxima of the intensity profile differing in terms of their light properties. It is thereby possible to prevent the occurrence of obtrusive interference so that obtrusive speckle patterns are largely eliminated, with the result that beam shaping quality, in particular for laser processing processes, can be considerably improved.

15 Claims, 6 Drawing Sheets

(51) Int. Cl.
*B23K 26/0622* (2014.01)
*B23K 26/064* (2014.01)
*B23K 26/073* (2006.01)
*G02B 27/09* (2006.01)
*G02B 27/28* (2006.01)
*G02B 27/48* (2006.01)

(52) U.S. Cl.
CPC ...... *B23K 26/0626* (2013.01); *B23K 26/0673* (2013.01); *B23K 26/073* (2013.01); *G02B 27/0944* (2013.01); *G02B 27/283* (2013.01); *G02B 27/48* (2013.01)

(56) References Cited

U.S. PATENT DOCUMENTS

| | | | |
|---|---|---|---|
| 6,717,104 B2 | 4/2004 | Thompson, Jr. et al. | |
| 6,909,735 B2* | 6/2005 | Lizotte | B23K 26/067 359/225.1 |
| 7,139,294 B2* | 11/2006 | Sun | H01S 3/109 372/10 |
| 2005/0157762 A1 | 7/2005 | DeMaria et al. | |
| 2005/0185683 A1 | 8/2005 | Ohtsuki | |
| 2008/0014685 A1* | 1/2008 | Govorkov | B23K 26/0604 438/150 |
| 2009/0310206 A1* | 12/2009 | Gluckstad | G02B 27/52 359/238 |
| 2012/0152915 A1* | 6/2012 | Srinivas | B23K 26/40 219/121.61 |
| 2012/0249989 A1 | 10/2012 | Fujii | |
| 2017/0276951 A1* | 9/2017 | Kumkar | B23K 26/0624 |

FOREIGN PATENT DOCUMENTS

| | | | | |
|---|---|---|---|---|
| EP | 0540759 | A1 | 5/1993 | |
| EP | 1068923 | A2 | 1/2001 | |
| EP | 2944412 | A1 * | 11/2015 | ......... B23K 26/0617 |
| JP | 05104276 | A * | 4/1993 | |
| JP | 2007253167 | A | 10/2007 | |
| JP | 2015188900 | A | 11/2015 | |
| JP | 2015221918 | A | 12/2015 | |
| WO | 0067945 | A1 | 11/2000 | |
| WO | 2005050286 | A1 | 6/2005 | |
| WO | WO-2011148788 | A1 * | 12/2011 | ......... B23K 26/0648 |
| WO | WO-2015165471 | A1 * | 11/2015 | ........... G03H 1/0808 |

* cited by examiner

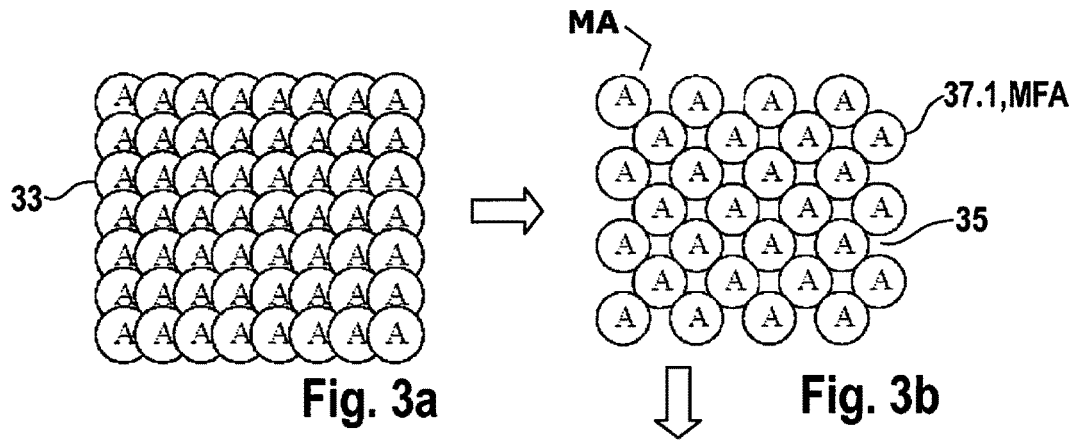
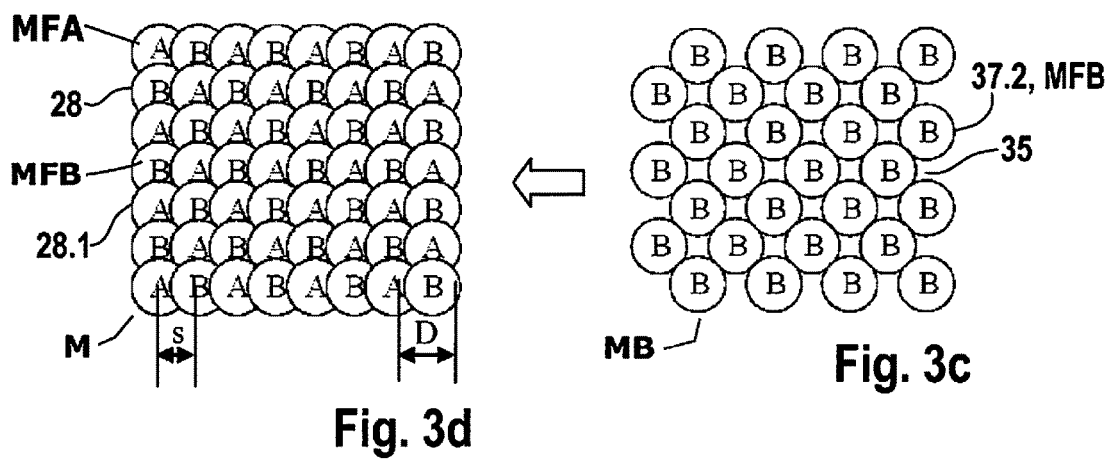
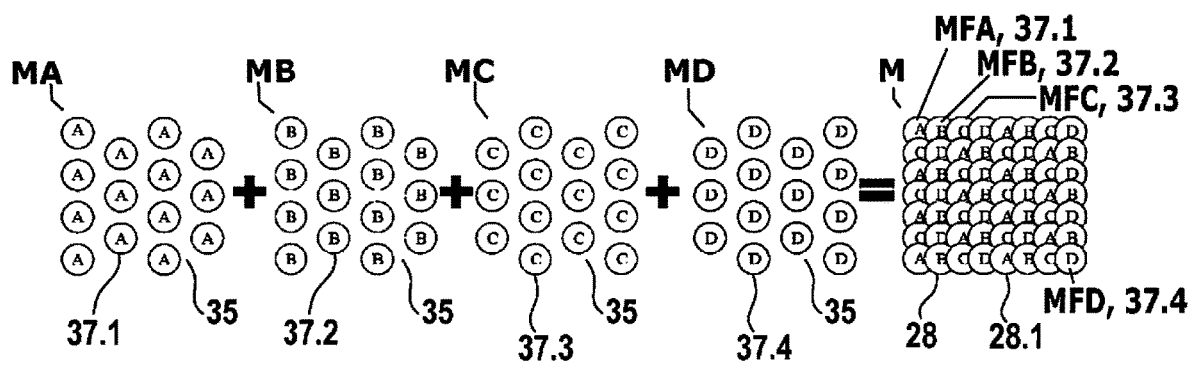
Fig. 4

METHOD AND DEVICE FOR SHAPING RADIATION FOR LASER PROCESSING

FIELD OF THE INVENTION

The invention relates to a method for beam shaping in a laser processing process, in which, in a laser assemblage, a laser beam is focused onto a processing/imaging plane and the laser beam can be adapted in terms of its intensity distribution by way of at least one beam shaper.

The invention further relates to an apparatus, in particular a laser assemblage, having a computer unit, for carrying out the method according to the present invention.

BACKGROUND INFORMATION

Laser material processing (laser ablation, welding, soldering, cleaning, drilling, sintering, melting, etc.) in most cases works with focused laser beams that exhibit a Gaussian intensity distribution. For many of these processes, however, it is highly advantageous to adapt the intensity distribution in the processing plane to the process. Beam shaping in the processing plane offers enormous optimization potential for laser process development.

In order to enable a laser beam to be shaped in terms of its intensity distribution, either its phase or its amplitude, or both together, must be modulated. Phase modulators, amplitude modulators, or phase and amplitude modulators correspondingly exist. The great disadvantage of amplitude modulators (e.g. DMD micromirror arrays) is that when they are used for beam shaping, a portion of the laser radiation of the original beam is usually blocked out, so that the energy efficiency of the overall system decreases. The advantage of phase modulators is that they do not influence the amplitude of the original beam, and that (almost) all the energy can therefore be used for the laser processing process. Phase modulators are based in turn on two different principles: the refraction principle and the diffraction principle. Refractive and diffractive beam shapers accordingly exist. The beam-shaping capability of the former is quite limited: principally, only simple, and also for the most part axially symmetrical, beam shapes can be generated, e.g. so-called "top hat" beams, Bessel beams, Airy beams, donuts, etc. Complex geometries, in particular those that do not exhibit a rotational or rectangular symmetry, require the use of free-form surfaces. Corresponding design and production methods have already been developed, but are not yet standard in the industry. Diffractive beam shapers, on the other hand, offer far more capabilities for beam shaping and beam splitting, since the corresponding microoptical structures can be produced, for example, using lithographic methods, injection molding, or stamping, and can be calculated using established phase retrieval algorithms. Switchable beam shapers, based e.g. on liquid crystal technology or micromirror arrays, are also increasingly available on the market.

Diffractive beam shapers usually involve one-dimensional or two-dimensional array structures that impress a discretized phase retardation (phase distribution) onto the (unshaped) incident laser beam. As a result of the modification of the phase distribution of the incident laser beam, its intensity distribution in the Fourier plane (focal plane) is likewise modified or modulated. The known diffractive beam shapers are, for example, so-called diffractive optical elements (DOEs), which are constructed from glass or plastic and have a fixed, unmodifiable diffraction structure incorporated into them. Also known are flexible or programmable beam shapers such as spatial light modulators (SLMs), preferably liquid crystal-based phase modulators having birefringent liquid crystals.

The diffraction structure that is incorporated into a DOE or programmed into the SLM is called a "phase mask." A variety of algorithms, selected based on the requirements for a beam shape, are used to design these phase masks. A so-called diffractive diffuser algorithm based on the iterative Fourier transform algorithm (IFTA), is popular. The purpose of this algorithm is to generate from the unshaped incident beam, by impressing the phase mask, a set of diffraction orders that produce the desired beam profile or the desired intensity distribution in the processing plane. The diffractive diffuser algorithm (hereinafter "IFTA") can be used for beam splitting and for beam shaping. The term "beam splitting" is used when the individually generated diffraction orders are sufficiently spaced apart from one another and essentially do not overlap. The term "beam shaping" is used when the individual diffraction orders are located so close to one another that they produce, because of their positional superposition, a desired beam profile that is expressed as a planar intensity distribution.

The phase masks generated with the aid of IFTA offer several advantages as compared with other algorithms, and are therefore preferably used in laser material processing. The IFTA diffractive diffuser algorithm:
  offers very high laser radiation energy utilization efficiency (little radiation scattering);
  generates phase masks that exhibit little alignment sensitivity with respect to the laser beam location on the beam shaper;
  assembles a desired beam profile from individual diffraction orders of the input beam, with the result that the depth of field of the generated beam profiles is the same as that of an unshaped focused input beam;
  is relatively simple to implement (in mathematical terms);
  is a fast algorithm (in terms of computation time).

Especially when the diffractive diffuser is used as a beam splitter, in which case each diffraction order represents an image of the input beam, this algorithm offers high precision in terms of position adjustment and individual spot power level: at present, it is possible to generate beam splitter phase masks in which the variation in power level in the individual diffraction orders in the processing plane is in the range of +/−0.5%.

Given the advantages listed, phase masks for DOE and SLM are often calculated using the above-described IFTA when beam splitting is important. For beam shaping, this algorithm has a significant disadvantage: the individual diffraction orders are located so close to one another that in certain cases (e.g. in a context of phase jumps in the adjacent diffraction orders) undesired interference occurs between those adjacent diffraction orders. A contrast ratio of up to 100% therefore occurs due to alternating constructive and destructive interference. These interference phenomena, or "speckle" patterns, are obtrusive in laser processing. A great disadvantage therefore exists in the context of beam shaping using the IFTA diffuser algorithm, and must be eliminated so that the many advantages of that algorithm can be utilized.

U.S. Pat. No. 6,717,104 B2, for example, describes a system for material processing using laser radiation, made up of a laser source that generates a laser beam which is directed to a workpiece; a spatial light modulator (SLM) that has individually addressable elements for influencing the phase profile of the laser beam, in order to generate an associated intensity distribution on the workpiece; and a control unit that is connected to the SLM in order to address its individually addressable elements so that the phase profile of the laser beam can be adjusted in such a way that a desired intensity profile, suitable for the intended material processing, is achieved on the workpiece. Sensors are furthermore directed upstream from the SLM and onto the workpiece, and detect the intensity distribution and transmit to the control unit data on the basis of which deviations in the phase distribution can be corrected.

EP 000000540759 A1 discloses an optical device for generating patterns in space, which device has at least one coherent light source, a planar light modulator (spatial light modulator, SLM) for shaping the wave front of the light of the coherent light source, and an apparatus for receiving the complex amplitude distribution on the light modulator. The optical device is suitable for applying (structured) patterns onto an object. The document describes, inter alia, multiple exposure of the object that is to be structured, such that different data sets, which result in the same pattern on the object to be structured, are delivered successively in time to the light modulator. The speckle patterns on the object are thereby averaged.

WO 00206104704 A1 describes an apparatus for decreasing speckle patterns in a laser projector that uses a spatial light modulator (SLM) having a predefined pixel rate. In the apparatus, a laser beam is split by a beam splitter into two beams, the first beam being shaped by a first half-wave plate into an s-polarized beam, and the second beam being shaped by a second half-wave plate into a p-polarized beam. The beams are combined after the SLM in order to decrease the speckle patterns. The assemblage described in this document relates to a laser projector for reproducing images on a projection screen, and therefore relates to the occurrence of so-called "subjective" speckles.

U.S. Pat. No. 6,577,429 B1 describes a display apparatus with decreased speckle pattern formation, for example constituting a projection device, made up substantially of: a pulsed laser; a beam splitter assemblage for generating partial laser beams respectively time-delayed with respect to one another, the time delay being greater than or equal to the coherence length of the laser; a diffuser that decreases the coherence of the partial laser beams; a honeycomb integrator that improves illumination uniformity and further reduces speckle pattern formation; and a planar light modulator and a projection lens for image presentation.

In laser material processing in particular, "objective" speckle patterns, i.e. speckles that form directly in the processing plane on the material surface that is to be processed, can have negative effects on processing quality, for example in laser welding, ablation, soldering, etc. Parallel Applications of the Applicant which are not yet published describe different approaches with which beam quality can be improved. These Applications describe inter alia, for example, approaches with which the obtrusive speckle patterns described earlier can be compensated for.

SUMMARY

An object of the invention is to suppress the occurrence of undesired interference between the individual adjacent diffraction orders in the beam profile that is generated or shaped with the aid of the diffractive diffuser algorithm, in order to enhance processing quality using any coherent and shaped radiation.

A further object of the invention is to furnish a corresponding apparatus, in particular a laser assemblage having a computer unit, for carrying out the method.

Provision is made according to the present invention that in order to avoid uniformity defects in the processing/imaging plane, the laser beam is split by way of at least one beam splitter into at least two partial or individual beams, and the partial or individual beams are differently influenced, or each partial or individual beam is constituted from a laser source having a different wavelength, in such a way that after they are combined and focused onto the processing/imaging plane they form an output beam having an intensity profile, adjacent intensity maxima of the intensity profile of the output beam differing in terms of at least one or several light properties in order to exclude the formation of interference. In accordance therewith, the "properties" of the light are meant to be those for which, in the context of combining at least two light beams having at least one identical light feature to be constituted physically, the criteria exist for the formation of interference. The adjacent intensity maxima are each associated with one partial or individual beam. A respective intensity maximum exists as a result of an established beam profile of the partial or individual beam. Advantageously, undesired interference between the adjacent diffraction orders can thereby be prevented despite the coherent laser radiation, which considerably enhances beam quality in the processing/imaging plane and thus helps to improve the laser processing processes. The aforementioned speckle patterns, inter alia, can thereby be avoided.

A variety of selection possibilities exist in terms of the aforementioned at least one or several light properties that are to be distinguished. In a preferred method variant, provision is made that the partial or individual beams are differently influenced, in terms of their phase and/or their intensity profiles and/or their wavelengths, by way of beam shapers and/or delay units and/or wavelength manipulators. It is thereby possible, in one case, to rule out interference between directly adjacent sub-partial beams, since with different definable delays they arrive in the processing/imaging plane at different times, i.e. are located apart from one another in time by more than the coherence length of the laser radiation, or by more than the pulse duration for pulsed radiation, and therefore cannot interfere. In the other case, what can be achieved by corresponding beam shaping and generation of the individual beams or sub-partial beams is that sub-partial beams of a partial beam are projected onto the processing/imaging plane with sufficient positional separation that they cannot interfere. If directly adjacent intensity maxima have a slightly different wavelength, obtrusive interference can likewise be prevented. All these method-related approaches thus complement one another, and in combination constitute an ideal method for avoiding both undesired interference between the adjacent diffraction orders and the intensity contrast (uniformity defects) resulting therefrom, as described above.

A particularly advantageous method variant for avoiding obtrusive speckle patterns provides that the laser beam is split into at least two differently polarized partial beams; and the partial beams are each modified by way of beam shapers in terms of their intensity profiles; and after the differently polarized partial beams are combined, the intensity profiles of the two partial beams are superimposed on one another in the processing/imaging plane to yield the target beam profile, adjacent intensity maxima of the intensity profiles each having a different polarization and each being associated with one partial beam. Because, in this case, the adjacent intensity maxima are differently polarized in the processing or imaging plane, they cannot interfere with one another, so that the speckle effect can be considerably reduced and laser processing quality can be enhanced. With this proposed interleaving of two intensity distributions with rotated polarization, these undesired intensity variations or uniformity defects that have a obtrusive effect as speckle patterns can be avoided, and this highly flexible beam-shaping approach can nevertheless be utilized. It is noteworthy in this context that a method in which the laser beam is first correspondingly shaped, and beam splitting and polarization rotation then occur before the partial beams are combined, is also conceivable.

It is advantageous with regard to computer-based generation of the phase and/or amplitude masks if the intensity profiles of the partial or individual beams (or sub-partial beams) are combined in the processing/imaging plane as a regular pattern having repeating pattern fields. The individual pattern fields can thus be disposed in their entirety so as to yield simple geometric shapes, so that the regular patterns is then present, for example, as a checkerboard pattern, as a honeycomb pattern, as a triangular or diamond pattern, or as another regular pattern. The intensity profile of the output beam is thus constituted from adjacent pattern fields that are constituted by a respective intensity profile of a partial or individual beam. Directly adjacent pattern fields are in turn constituted by partial or individual beams that differ in terms of at least one, or several, of the aforementioned light properties.

Preferably, at least several partial beams of at least a first type (e.g. type A) are spaced apart from one another in a first matrix configuration, and at least several partial beams of at least a second type (for example, type B) are spaced apart from one another in a second matrix configuration, the at least first and second matrix configurations of partial beams in the processing/imaging plane being disposed with respect to one another in interleaved fashion, forming the regular pattern in such a way that directly adjacent pattern fields are associated with a respectively different type of partial beam (for example, the regular pattern exists as an ABABA etc. configuration of partial-beam types). When there are more than two types of partial beams, their associations can repeat to yield constituted pattern fields of the regular pattern in the processing/imaging plane in a respectively identical sequence (for three types of partial beam, for example, the regular pattern is present as an ABCABCABC etc. configuration of the partial-beam types). For specific applications, however, the repetition can also be based on a different repetition formula, for example constituting a pattern as an ABCABABABCABABABC etc. configuration of the partial-beam types. In preferred embodiments, the individual partial beams within a matrix configuration of a respective type are spaced apart from one another at least sufficiently far that no interference phenomena occur between those partial beams.

The intensity profile of the output beam in the processing/imaging plane can now be adjusted very variably and specifically depending on the pattern that is constituted, as presented below:

a) One pattern manifestation is produced by the fact that partial beams of at least a first and of a further type, in particular of all types, are spaced apart from one another, with the result that, in particular, directly adjacent pattern fields correspondingly constituted within the processing/imaging plane have an unirradiated spacing region with respect to one another. Alternatively or additionally, partial beams of at least the first and of the further, or of another, type, in particular of all types, are disposed directly adjacently and/or overlappingly with respect to one another, with the result that, in particular, directly adjacent pattern fields correspondingly constituted within the processing/imaging plane overlap and/or abut against one another in gap-free fashion.

b) Another pattern manifestation emerges from the fact that the partial beams of at least one type or of several, in particular of all, types have, with their respective matrix configuration, the same beam profile or the same intensity values, the same cross-sectional sizes, and/or the same cross-sectional shapes. Alternatively or additionally, partial beams of at least one or of several, in particular of all, types differ in terms of their beam profile or their intensity values, in terms of their cross-sectional sizes and/or in terms of their cross-sectional shapes. The cross-sectional shape of a pattern field can thus be shaped, for example, as a circle, as a rectangle or square, as a triangle, as a diamond, or as an n-sided polygon (where n>5). In principle, an intensity value of zero can also be provided locally within the respective matrix configuration of the different types, so that locally, no beam is effective. A regular pattern in the working/imaging plane, having irradiated and unirradiated pattern fields, can therefore also exist. An output beam having a wide variety of cross-sectional shapes in the working/imaging plane can thus be shaped depending on the setting as to which pattern fields are irradiated or left unirradiated by partial or individual beams, such that the cross-sectional shape results from all the irradiated pattern fields.

c) A further pattern manifestation exists by the fact that the partial beams of at least one type or of several, in particular all, types image onto the same focal plane within their respective matrix configuration. Alternatively or additionally, partial beams of at least one or several, in particular of all, types differ in terms of their focal plane in which they respectively image. The pattern that is embodied can thereby be adapted to any surface profile of the processing/imaging plane.

An advantageous method variant provides that furthermore, by way of the beam shapers, the partial beams are sequentially modified at short time intervals using at least one phase and/or amplitude mask which results in the same desired intensity distribution in the processing/imaging plane. Each of these phase and/or amplitude masks results in different speckle patterns. When the different phase and/or amplitude masks are displayed in succession by way of the beam shaper, the different intensity contrasts or speckle patterns become superimposed in time, i.e. incoherently, in the processing/imaging plane, thus producing a time averaging that results in a reduction in the intensity contrast or speckle contrast. If the spacing between the alternating speckle patterns is small enough, the processing quality can additionally be enhanced. A prerequisite here is that the system used for beam shaping possess a sufficiently high image repetition frequency to implement the different phase and/or amplitude masks.

It is advantageous here if different phase and/or amplitude masks are defined for laser processing as a function of a target beam profile. Said masks can be stored in a computer unit for the laser processing system, or can be generated depending on the target beam profile.

A method variant that is also advantageous provides that the partial beams are modified, each separately or together, using the phase and/or amplitude masks.

In a preferred method variant, diffractive diffusers that are embodied as spatial light modulators (SLMs) are used for beam shaping. Beam shaping by phase modulation can advantageously be accomplished using a liquid crystal on silicon (LCoS) SLM unit, in which, by way of an array of birefringent liquid crystals, the phase of the incident laser beam can be discretized by the fact that each pixel exhibits a differently addressable angular orientation of the liquid crystals. Rapid and flexible high-resolution modification of the phase in the raw beam can thereby be enabled, and the modification of the laser power density distribution in a processing plane or projection plane can be adapted, based on a Fourier transformation, using a lens system. Beam shaping can also be effected, in principle, by amplitude modulation using a digital micromirror device (DMD) unit in the beam-shaping module. Here an array of individually addressable micromirrors discretizes the incident laser beam by splitting it into many small partial beams, so that the intensity distribution of the laser beam in the processing plane can be adapted as a result of the differing deflection of the individual beams. The incident light is in part reflected directly back, which occurs with a horizontal mirror position, or is in part cut out from the ray bundle by tilting the micromirror. Energy efficiency decreases as a result, however, which can represent a disadvantage as compared with SLM units as beam shapers.

Both a pulsed or a non-pulsed coherent light source (laser), such as those used in laser material processing, can be used for the method according to the present invention.

When pulsed lasers are used, the laser beam, after being split into at least two partial or individual beams having different intensity profiles for each partial beam, can be time-delayed by way of the delay units differently for each partial or individual beam, so that after they are combined and focused onto the processing/imaging plane, an output beam having an intensity profile is constituted without superimposition, at least in terms of time, in the processing/imaging plane. In order to generate the different intensity profiles for each partial beam, the beam shaper can be combined with the beam splitter or can be placed after the delay units before the beam combining system. This method variant can be used particularly advantageously with short- or ultrashort-pulse lasers, for example picosecond (ps) or femtosecond (fs) lasers, to avoid undesired beam interference in the processing/imaging plane.

In order to entirely avoid time-related superimpositions after the partial beams are combined, in a preferred method variant the minimum delay is selected to be longer than or equal to the pulse duration of the laser beam.

In a preferred method variant, no delay is selected for the first partial beam, a delay corresponding to at least the pulse duration of the laser beam is selected for the second partial beam, a delay corresponding to at least twice the pulse duration of the laser beam is selected for the third partial beam, and a delay corresponding to at least (n−1) times the pulse duration of the laser beam is selected for the n-th partial beam. The result that can be achieved thereby is that the fastest and the slowest partial beam arrive at the processing plane within the shortest possible interval, so that there is only minimal time distortion of the overall beam profile.

A further variant embodiment provides that the laser beam is split into n partial beams, of which at least one partial beam is varied in terms of its beam shape using a beam shaper, and of which the other partial beam or beams is/are combined, without beam shaping, with the at least one beam-shaped partial beam to yield an irradiation field on the workpiece that is to be processed in the processing/imaging plane, or the other partial beams are deliberately caused to interfere, in order to perform different irradiating tasks simultaneously. On the one hand, it is thereby possible to reduce heating of the beam former unit since there is no need to beam-shape the entire laser output, and on the other hand different irradiation tasks can also thereby be carried out in one step. For example, laser ablation processes, or patterning processes assisted by laser interference, can thereby be implemented. The above-described avoidance of uniformity defects can be ensured with this approach as well. Be it noted here that further details regarding this method variant are described in a parallel Application that is not yet published.

A preferred use of the method as described above with its variants is constituted by utilization in laser processing systems for laser ablation, laser drilling, laser marking, laser soldering and laser welding, laser cutting, laser sintering and hardfacing, laser cleaning, laser hardening, laser remelting, laser alloying and dispersing, or laser polishing, in which perfect beam quality with homogeneous shaping is important. Obtrusive speckling in the context of beam shaping, which can result in inaccuracies, can in particular be compensated for with the method presented.

The object that relates to the apparatus is achieved by the fact that the laser assemblage and the computer unit have devices for carrying out the method that has been described above; and the laser beam is splittable by way of at least one beam splitter into partial or individual beams or each partial or individual beam is generatable from a laser source having a different wavelength; and by way of beam shapers and/or delay units and/or wavelength manipulators that are addressable by the computer unit, the partial or individual beams are influenceable differently in terms of their phase, polarization, wavelength, and/or intensity profiles; and that after they are combined using a beam combining system and are focused onto the processing/imaging plane, an output beam having an intensity profile is formable, adjacent intensity maxima of the intensity profile differing in terms of their light properties in order to rule out the occurrence of interference. In principle, the above-described approaches or principles, and laser assemblages of this kind, for avoiding undesired interference phenomena between the adjacent diffraction orders (polarization, wavelength, delay beyond the coherence length or pulse duration) can be integrated, optionally at least partly in combination, into existing laser processing systems. Combining them can in many cases result in advantages in terms of shrinking the installation space of the apparatus, increasing the number of diffraction order types, and thus also further reducing interference phenomena.

BRIEF DESCRIPTION OF THE DRAWINGS

FIGS. 3a to 3d schematically depict the principle of the invention.

FIG. 4 schematically depicts an exemplifying interleaving of four differently beam-split profiles to yield a rectangular top-hat.

DETAILED DESCRIPTION

Figure 1:
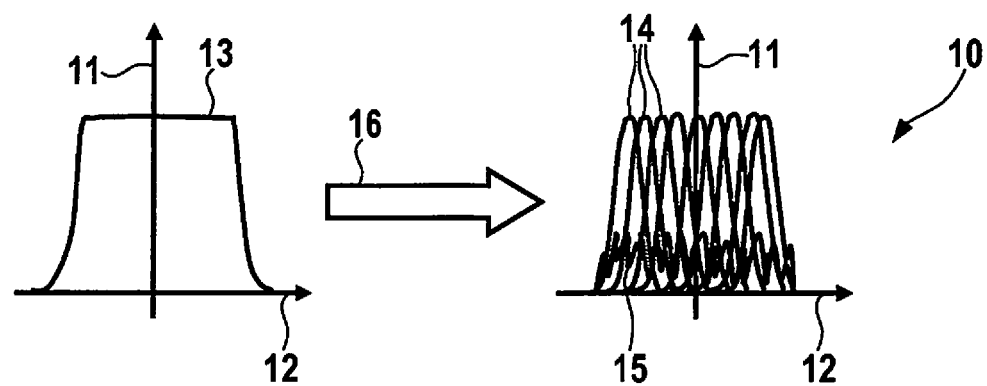
FIG. 1 schematically depicts a diagram of the superimposition of individual beam profiles to yield a target profile using a diffractive diffuser.

FIG. 1 schematically depicts, in a diagram 10, the disadvantage described previously when a diffractive diffuser 16 is used. The intensity distribution of a target profile 13, schematically depicted as a curve for an intensity 11 as a function of spacing 12, is assembled by way of diffuser 16 by superimposing several diffraction orders 14. If these diffraction orders 14 are located too close to one another and have a large phase variation, they interfere, causing undesired interference phenomena also called "speckles" 15. As a result of constructive and destructive interference, these uniformity defects or speckle patterns disrupt the imaging of target profile 13.

Depending on the imaging system that is used, a distinction is furthermore made, in the predominantly English-language literature, between "subjective" and "objective" speckles. Subjective speckles are produced, for example, by viewing a screen that has a rough surface, and they change, for example, with the viewing angle, since the phase offsets and the interference patterns resulting therefrom are impressed only at the screen (or also by surfaces in the optical system), for example due to the surface roughness. Objective speckles result from phase jumps in the diffractive optical element (DOE), and are therefore defined by the Fourier transformation of the phase mask.

Figures 2A, 2B:
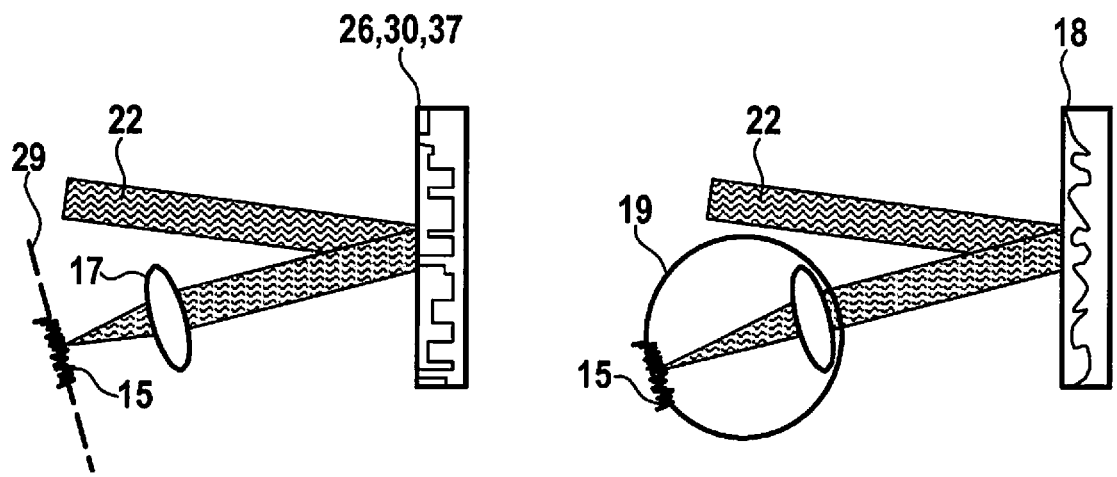
FIGS. 2a and 2b schematically depict the difference between objective and subjective speckles.

FIGS. 2a and 2b schematically illustrate the difference. Objective speckles are produced in the focal plane or in processing/imaging plane 29 (see FIG. 3), after deliberate beam shaping using a diffractive optical element (DOE) or spatial light modulator (SLM)(schematically depicted here as beam shaper 26, 30; see FIG. 3). In other words, the interference pattern is produced because of the type of beam shaping that is used, constituting a phase modulation of coherent radiation of a laser beam 22. These interference patterns are not produced in the observer's eye, but instead already exist as speckles 15 in the focal plane or in processing/imaging plane 29. These objective speckles 15 are to be avoided in accordance with the stated object of the invention.

FIG. 2b schematically describes, in contrast thereto, the production of "subjective" speckles as a shimmer on a diffuse surface 18 illuminated with coherent radiation (laser beam 22). A diffuse surface 18 is practically any rough surface. The effect is most visible on surfaces that have a roughness on the order of the wavelength of the coherent radiation. These speckles are interference phenomena that are produced as a result of diffraction at surface 18, but these speckles 15 are visible only in the observer's eye 15 or in a camera. This speckle pattern does not exist in the imaging plane.

The essence of the invention is that all the advantages of the diffractive diffuser algorithm for calculating phase masks for beam splitting of the coherent radiation are utilized, so that it is also possible thereby to carry out beam shaping with no occurrence of undesired interference between the adjacent diffraction orders. The following principles are utilized in this context:

1) As described above, phase masks for beam splitting can be calculated in simple and accurate fashion using the IFTA diffractive diffuser algorithm.
2) The obtrusive artifacts or interference (speckles) occur between the superimposed diffraction orders in the context of beam shaping using IFTA, since the laser light is coherent.
3) Two locally overlapping or superimposed laser beams cannot interfere if they:
   i. are differently polarized;
   ii. have different wavelengths;
   iii. are farther apart from one another in time than the coherence length of the laser radiation;
   iv. do not overlap in time (for example with pulsed lasers, if one pulse arrives not simultaneously with the other but instead after it).

Principles i. to iv. constitute a solution space for avoiding the formation of undesired interference between the adjacent and overlapping diffraction orders when they are combined with the following idea that is depicted schematically in FIGS. 3a to 3d.

FIG. 3a depicts by way of example a target beam profile 33 (here a rectangle) in which two diffraction orders can overlap and therefore interfere; this results in increases and decreases in intensity, which are expressed as obtrusive speckle patterns. FIGS. 3b and 3c show, for two types A and B of partial beams 35, the respective output intensity profiles for the first partial beam 37.1 (type A) and for the second partial beam 37.2 (type B). The pattern depicted in FIG. 3c is complementary to the pattern depicted in FIG. 3b. Partial beams 35 of type A and partial beams 35 of type B are respectively in a matrix configuration MA and MB in which partial beams 35 having respective intensity values 37.1 and 37.2 are disposed at notional intersection points of a respective grid. The grid can have, for example, main grid lines that proceed orthogonally or at an angle to one another. The individual partial beams 35 within a matrix configuration MA, MB of a respective type are preferably spaced apart from one another at least sufficiently far that no interference phenomena occur between those partial beams 35. FIG. 3d shows intensity profile 28.1 for output beam 28 assembled from the two partial beams 35, in which the two diffraction orders can overlap but cannot interfere, since diffraction orders "A" and "B" have very specifically different light properties. Output beam 28 is constituted as a regular pattern M of repeating pattern fields MFA, MFB, regular pattern M being embodied from a complementary interleaving of first and second matrix configurations MA, MB of partial beams 35 in the processing/imaging plane in such a way that directly adjacent pattern fields MFA, MFB are respectively associated with a different type of partial beam 35. The central idea of the invention is that the adjacent diffraction orders are canceled in the context of IFTA-based beam shaping, so that the IFTA is actually intended to calculate a phase mask for beam splitting (step 1, from FIG. 3a to FIG. 3b). The image that would result from such a calculation would exhibit gaps (see FIG. 3b, embodied here as a checkerboard pattern). In step 3 those gaps must be closed up again (FIG. 3d), specifically using a complementary image that is generated in step 2 and is made up of individual diffraction orders that cannot interfere with the first diffraction orders (in accordance with principles i. to iv.; cf. FIG. 3c).

FIGS. 3a to 3d are a merely schematic depiction of the idea; a pattern manifestation of the regular pattern M that is formed can be shaped in various ways, in particular in accordance with at least one of, or in combination several, variation options a) to c) that have already been set forth above in the general descriptive section. In the same or similar fashion, it is conceivable not merely for two different types of diffraction order "A" and "B" to be combined into a desired beam profile, but for even more diffraction order types to be used (additionally referred to as "C", "D", etc.) in order to increase the spacing between the diffraction orders of the same type and to even further minimize, or entirely exclude, interference (FIG. 4). Schematically depicted here are four partial beams 35 that each have a different output intensity profile 37.1 to 37.4 and are combined into an output beam 28 having an assembled intensity profile 28.1. Output beam 28 as a whole is constituted as a regular pattern M of adjacent pattern fields MFA, MFB, MFC, MFD, by the fact that four matrix configurations MA, MB, MC, MD of the respective partial beams 35 having intensity profiles 37.1, 37.2, 37.3, 37.4 are interleaved with one another as an ABCD configuration. Alternatively, a repeating formula of pattern fields MFA, MFB, MFC, MFD can also be embodied differently, for example as an ABACAD, ABCABD, ABABCABCD configuration, or another configuration.

This example will be discussed in further detail below. In one such configuration of the diffraction orders as depicted in FIG. 3d, step 3, the uniformity of the desired beam profile (rectangular top hat) depends on the spacings between the adjacent diffraction orders generated by the beam-splitting IFTA. The spacing s between the diffraction orders can thus be determined, for the IFTA calculations, from the required uniformity of the desired intensity distribution in the context of beam shaping, and then implemented with the aid of the IFTA. As an example, a beam profile uniformity in the range from 0% to 10% is usually required for top hats. Proceeding from rough calculations and intensity diagrams, it can be established that in this case the distance s between the adjacent diffraction orders should be in the range from a half to a whole individual diffraction diameter D. With programmable diffractive beam shapers (e.g. liquid crystal on silicon spatial light modulators LCoS SLMs)), the spacing s between the adjacent diffraction orders can be adjusted very flexibly.

FIGS. 5 to 10 show concrete laser assemblages 20 for technically implementing this concept.

Figure 5:
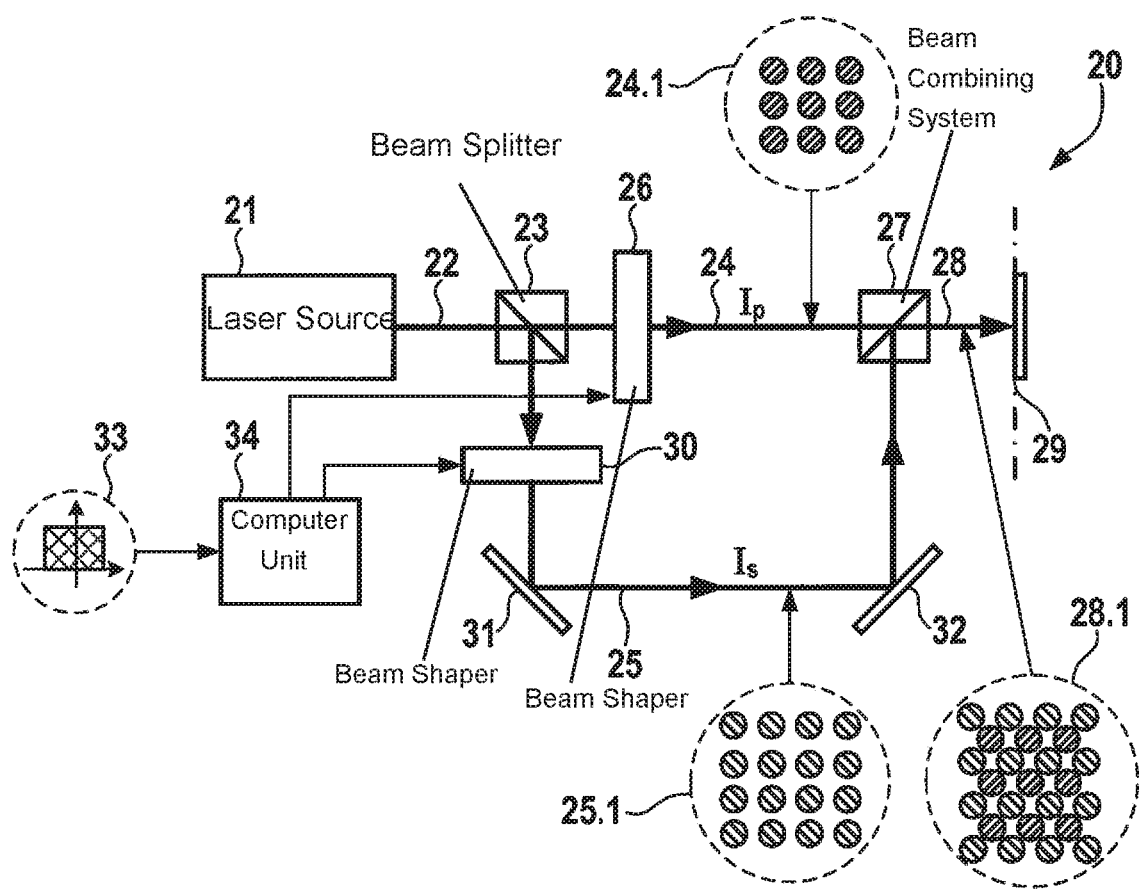
FIG. 5 schematically depicts a laser assemblage for processing workpieces.

FIG. 5 schematically depicts a laser assemblage 20 in accordance with the invention for processing workpieces.

Proceeding from a laser source 21, a laser beam 22 is split by way of a beam splitter 23 into two beam paths: a p-polarized and an s-polarized partial beam 24, 25. This can be achieved, for example, using a polarizing beam splitter. The laser power output in each beam path is intended to be adjustable, for example by way of a polarization adjustment of the output radiation. The s-polarized partial beam 25 is a beam component that is polarized linearly perpendicularly (index: s) to the plane of incidence. It is also referred to in the literature as the "transverse electric" (TE) component. In the other case, namely p-polarized beam 24, the amplitude of a wave polarized linearly parallel (index: p) in the plane of incidence is considered. It is also referred to in the literature as a "transverse magnetic" (TM) component.

The object is to project a predefinable target beam profile 33 ($I_0$), which is stored e.g. in a computer unit 34 for material processing, in ideal fashion onto a processing/imaging plane 29. A discrepant beam profile will be produced, however, as a result of system defects and speckles 15 (see FIG. 1).

In accordance with the invention, the two p- and s-polarized partial beams 24, 25 are therefore respectively modified, using beam shapers 26, 30, in such a way that for each partial beam, different intensity profiles 24.1 $I_{(p)}$ and 25.1 $I_{(s)}$ are produced, which are then combined by way of a beam combining system 27 and projected, as an output beam 28 having a common intensity profile 28.1 $I_{(a)}$, onto processing/imaging plane 29. Intensity profiles 24.1 $I_{(p)}$ and 25.1 $I_{(s)}$ are spatially defined in such a way that on the one hand they cannot of themselves interfere and generate obtrusive speckles 15. On the other hand, intensity profiles 24.1 $I_{(p)}$ and 25.1 $I_{(s)}$ are spatially defined in such a way that output beam 28, constituting a superimposition in processing/imaging plane 29, has an intensity profile 28.1 $I_{(a)}$ that ideally corresponds to the predefined target beam profile 33 ($I_0$), and the adjacent individual beams are differently polarized. A preferred intensity distribution can correspond to that of a checkerboard pattern, the white areas of the checkerboard corresponding, for example, to the individual intensity distributions of the p-polarized partial beam 24, and the black areas to the individual intensity distribution of the s-polarized partial beam 25. Because differently polarized radiation does not interfere, the speckle effect can be considerably reduced with this configuration. Hexagonal geometries in the form of a honeycomb pattern are also conceivable.

Appropriate polarization of the original laser beam can be established, for example, with the aid of a retardation plate in front of the beam splitter (not depicted in FIG. 5). The beam splitter can be embodied as a polarizing beam-splitter cube or as a thin-film polarizer.

In a further method variant, the previously mentioned combination of this method (superimposition of differently polarized partial beams) with the method for time-averaging of the speckle patterns is advantageous with regard to a further reduction in speckling 15.

The corresponding intensity profiles 24.1 and 25.1 are calculated in computer unit 34 so that beam shapers 26, 30 can be addressed. Beam guidance is effected by, inter alia, a variety of deflection mirrors 31, 32 as well as other optical systems, such as mirrors and/or lens systems; these are not, however, depicted in FIG. 5 and the further Figures in order to retain clarity.

Figure 6:
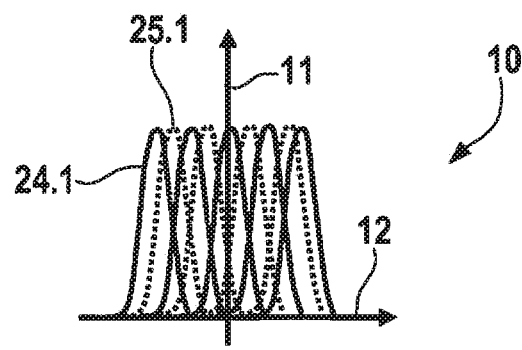
FIG. 6 is a further diagram showing the superimposition of differently polarized partial beam profiles to yield a target profile.

FIG. 6 schematically shows, in a diagram 10 depicting a curve for intensity 11 as a function of spacing 12, the assembling of target profile 13 of FIG. 1 from the differently polarized partial beams having their intensity profiles 24.1 $I_{(p)}$ and 25.1 $I_{(s)}$; because of their differing polarization, the adjacent beams do not interfere and therefore cannot generate any obtrusive interference phenomena or speckle patterns.

Alignment must be effected very accurately when the two beam-split intensity profiles are combined to yield a common image; for a single spot 40 μm in size, for example, a shift of a few micrometers in the two beam profiles with respect to one another can result in a large and disadvantageous intensity variation.

As a somewhat simplified alternative to the configuration depicted in FIG. 5, it is possible to use a configuration in which only one beam shaper or beam splitter is used, and which generates a checkerboard pattern of individual diffraction orders. This checkerboard pattern is split into two beam paths, the polarization of the individual beam paths being manipulated in such a way that the two beams can no longer interfere when subsequently combined. Combination occurs in offset fashion, so that the individual diffraction orders of the two checkerboard patterns engage into one another. This makes one disadvantage of this configuration clear: gaps occur on two sides of the beam profile and can, but need not necessarily, be obtrusive in terms of laser processing. An advantage is the elimination of a second beam splitter or beam shaper, and the accompanying reduction in the complexity of the overall system.

It is known that coherent laser radiation at different wavelengths does not interfere when the wavelength difference exceeds a few picometers. If two laser beams—having different wavelengths with a sufficient spectral offset, beam-split using two diffractive beam shapers (preferably SLMs or DOEs) in accordance with the principle depicted in FIGS. 3a to 3d, and combined again in the processing plane—are used, there is then little positional overlap between the individual diffraction orders of the same type. The overlap of the diffraction orders of the different types (A and B) produces no interference at all, since the A and B diffraction orders are of different wavelengths. The core principle of interleaving checkerboard patterns of diffraction orders of different types is applied again here as it was in the exemplifying embodiment described earlier. The difference is that here it is not the polarization but the wavelength of the two beam paths that is manipulated.

Figure 7:
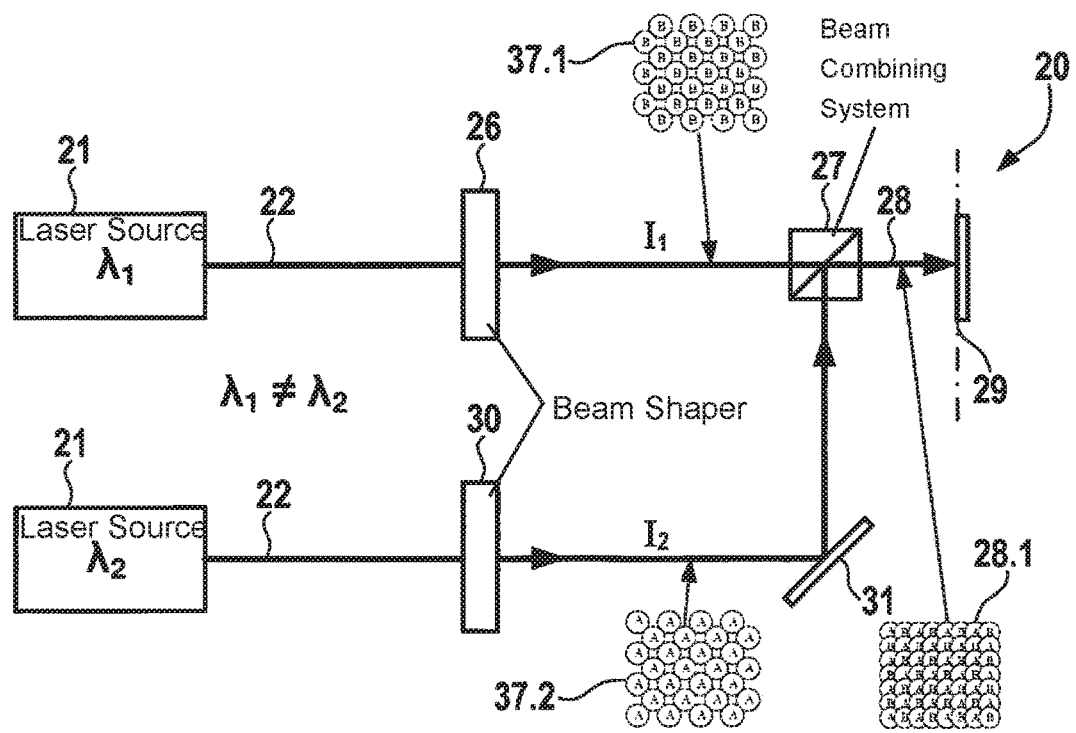
FIG. 7 schematically depicts a laser assemblage for processing workpieces using two laser sources having different wavelengths.

FIG. 7 shows a corresponding laser assemblage 20 having two laser sources 21 that emit a radiation at $\lambda_1$ and $\lambda_2$, such that the two wavelengths differ only slightly. Laser beam 22 of first laser source 21 is shaped using a first beam shaper 26. Laser beam 22 of second laser source 21 is shaped using a second beam shaper 30. The two output intensity profiles 37.1 and 37.2 of the two beams are then combined, using a beam combining system 27, into one output beam 28 having a superimposed intensity profile 28.1, and focused onto the processing/imaging plane 29. Because the directly adjacent individual diffraction images have different wavelengths, they cannot interfere, with the result that obtrusive interference, and thus the obtrusive speckle patterns, are avoided.

Figure 8:
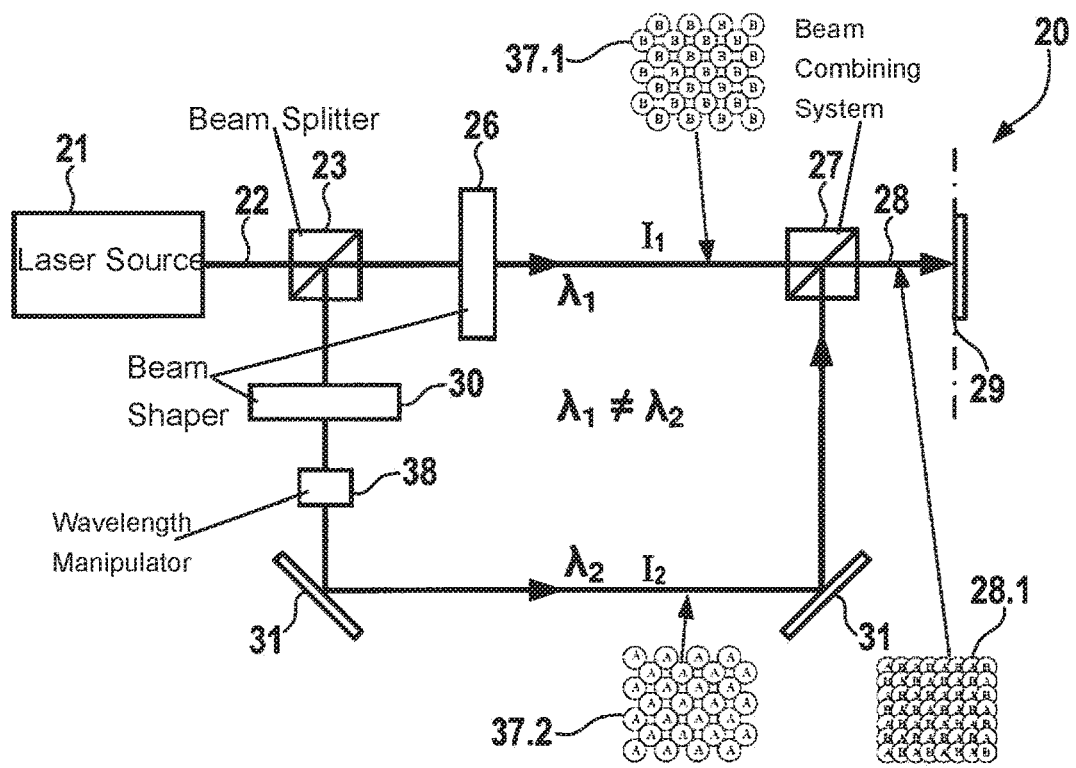
FIG. 8 is a further schematic depiction of an alternative laser assemblage having partial beams of different wavelengths.

As an alternative, as depicted in FIG. 8, it is also possible to use only one laser source instead of the two laser sources 21 (as in FIG. 7); after laser beam 22 has been split in two, the wavelength of the one partial beam is then manipulated using a wavelength manipulator 38. The specific manner in which the wavelength can be manipulated is immaterial here, and it can be accomplished using all known methods. Also conceivable is an embodiment in which only one beam shaper is used.

As a further alternative, it is conceivable to use more than two types of diffraction order. The final beam profile could be made up of more than two diffraction patterns (see diffraction patterns A, B, C, D, etc. as depicted in FIG. 4). The wavelength must, however, be different in all the beam paths.

If the adjacent diffraction orders are no longer coherent with one another, they then also do not interfere. This could be the case when a configuration as in FIG. 7 is used, in which context the wavelengths of the two laser sources 21 may be identical. Simply as a result of the use of two different laser sources 21, however, the two beams are no longer coherent with one another, and for that reason their diffraction orders cannot interfere. One alternative could be to use one laser source, as in FIG. 8, although instead of a wavelength manipulator 38 a time-delay element would be installed in the second beam path. That delay element ("delay line") would delay the second beam sufficiently that it is no longer coherent with the first one. The time delay requirement is obtained from a knowledge of the coherence length of the beam source: if the coherence length is X m, for example, then the spatial delay must also be equal to at least X m; or, converted into the time domain, $\Delta t = X$ m/c, where c is the speed of light. For X=50 m, a time delay of $1.67*10^{-7}$ s would be necessary. The beam can be delayed, for example, by lengthening its optical path (a configuration of several mirrors that reflect the beam back and forth) or by installing an optically dense medium in which the speed of light is lower than in the surrounding medium (e.g. a glass block).

As a further alternative, it is conceivable to use more than two types of diffraction order; the final beam profile could be made up of more than two diffraction patterns (diffraction patterns A, B, C, D, etc.) as depicted in FIG. 4. All the partial beams must, however, be delayed by n times the coherence length, where n represents the number of the respective partial beam.

Figure 9:
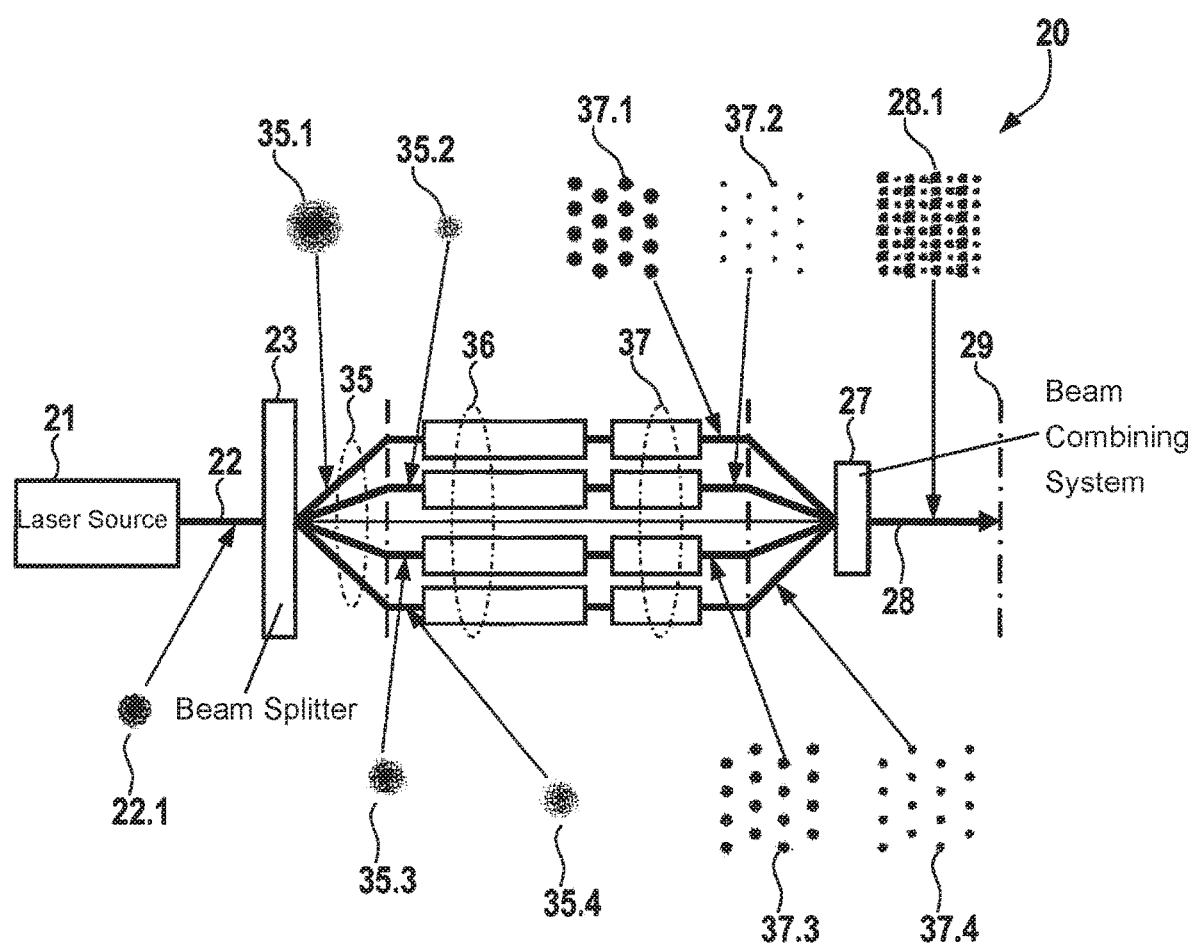
FIG. 9 is a further schematic depiction of a laser assemblage, in which the laser beam is split into different partial beams and individual beams.

FIG. 9 schematically shows a further laser assemblage 20 in which, proceeding from a laser source 21 that is embodied, in the example shown, as a pulsed laser, laser beam 22 having its intensity profile 22.1 is split by a beam splitter 23 into different partial beams 35. Each of these (in the example shown, four) partial beams 35 possesses its own intensity profile 35.1 to 35.4 and can be differently delayed using delay units 36. In addition, each of these partial beams 35 is split, using a separate beam shaper 37 for each partial beam, into further sub-partial beams that each have an output intensity profile 37.1 to 37.4. Beam shapers 37 are embodied, for example, as SLMs or DOEs and, like delay units 36, are addressed by a computer unit 34 (not depicted here). This last split is unproblematic in terms of speckle formation, since the sub-partial beams do not overlap positionally. Partial beams 35, which are made up of sub-partial beams, are then assembled using beam combining system 27 and focused, as output beam 28, onto processing/imaging plane 29. Each partial beam 35 represents, in processing/imaging plane 29, a kind of pixel array, in which the size of a sub-partial beam also represents the resolution limit of the overall image that is constituted by an assembled intensity profile 28.1 of output beam 28. The sub-partial beams that result from different partial beams 35 can overlap positionally without interfering, since they arrive with a time offset. This multi-stage splitting of laser beam 22 into partial beams 35 and sub-partial beams, the differing time delay of partial beams 35, and the assembly of the sub-partial beams into an image, result in a speckle-free image.

The above-described method variants, and the apparatus examples that have been described, function with both pulsed and non-pulsed coherent radiation.

With pulsed short- or ultrashort-pulse lasers, the pulse duration is typically a few microseconds to a few femtoseconds. The time interval between the individual pulses is usually considerably longer than the pulse length itself. This circumstance can be utilized in order to avoid speckle patterns in the context of beam shaping. A pulsed laser beam is split into several beams, each of which is shaped into a partial-beam profile. All the split and shaped beams are combined again, the partial beam profiles resulting in an overall desired beam profile. If the optical path of all the partial beams is identical, interference will occur when the partial beam profiles are positionally superimposed to yield an overall beam profile. If the partial beams are each differently delayed, however, no interference then occurs when they are positionally superimposed, since no superimposition in time will exist. A prerequisite for this is that the delay be longer than the pulse length, and that the partial beams have a time offset of at least the pulse length from one another. An effort should nevertheless be made to minimize the time offset between the fastest and the slowest partial beams that strike the processing plane, in order to avoid time distortion of the overall beam profile.

Figure 10:
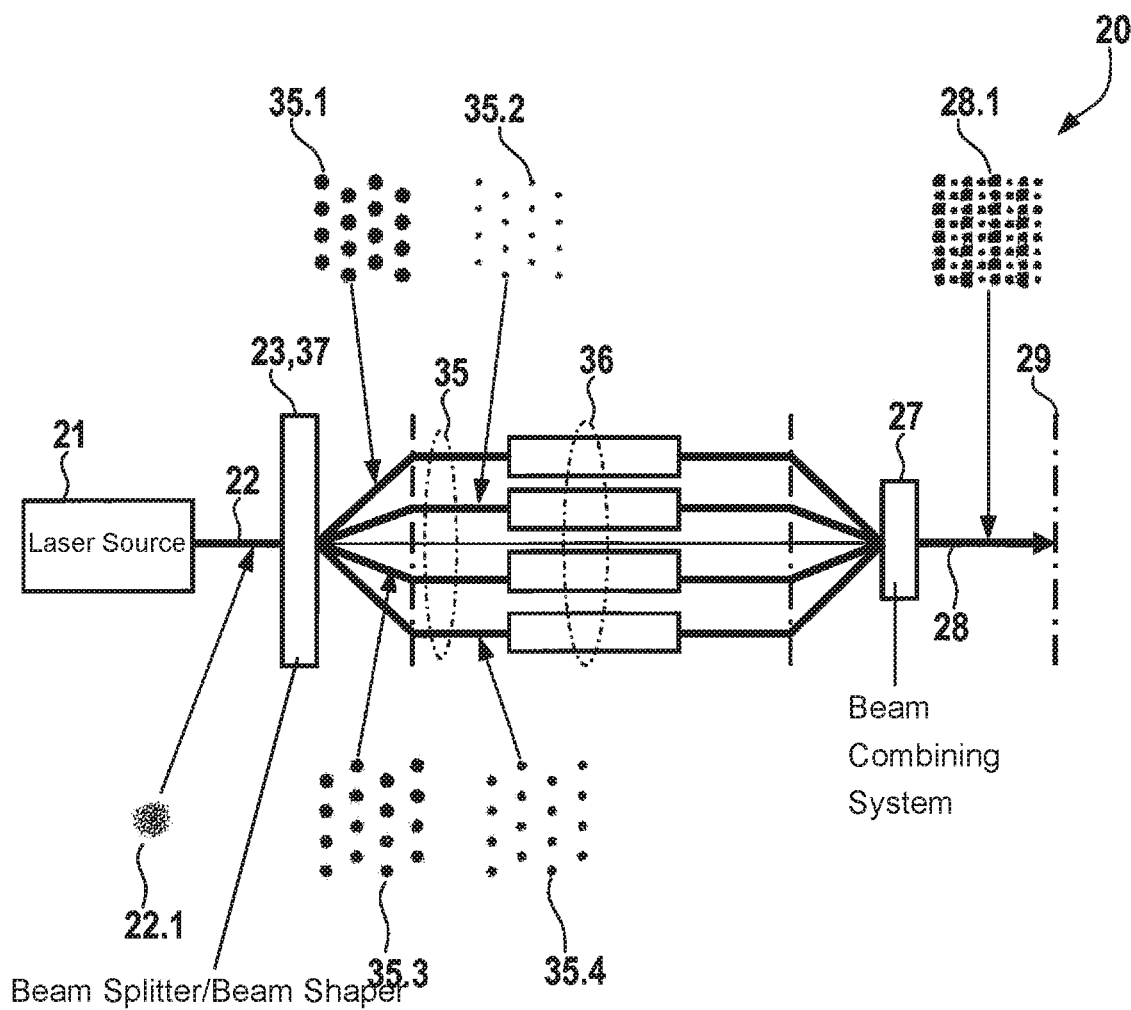
FIG. 10 is a further schematic depiction of a laser assemblage having a pulsed laser source.

A description of the configuration and manner of operation of this method variant is provided with reference to laser assemblage 20 depicted in FIG. 10. A pulsed laser beam 22 from a laser source 21, which is embodied e.g. as a picosecond or femtosecond laser, is split into, for example, four partial beams 35 in the components constituted by beam splitter 23 and beam shaper 37. These partial beams are in turn shaped, using a diffuser, into different beam patterns having different intensity profiles for each partial beam 35.1, 35.2, 35.3, 35.4. Each of these beam patterns is unique. When all the individual beam patterns are combined in processing/imaging plane 29 using a beam combining system 27, the result is an output beam 28 having an overall beam profile that exhibits an intensity profile 28.1 in the form of, for example, a square (i.e. a square top hat). Prior to combination of the partial beams, each of partial beams 35 is differently delayed by way of delay units 36 (delay lines). As already discussed above, the minimum delay should be greater than or equal to one pulse duration. For example, if the pulse duration is 1 ps, then $\Delta t_1$ should equal 0 and $\Delta t_2$ should be $\geq 1$ ps. The delay in the n-th partial beam would then be $\Delta t_n = (n-1)*1$ ps. It is thereby possible for the beam patterns shaped with a diffuser not to interfere with one another, since they do not positionally overlap. The overlapping regions are located in the respectively different partial beams 35 that, in turn, are separated from one another in time and therefore cannot interfere. Speckling in processing plane 29 is thereby prevented, and processing quality with a shaped laser beam is ensured.

Alternatively, in a further method variant or laser assemblage 20 not depicted here, beam shaping 37 can also occur after delay units 36 and before beam combining system 27.

The approaches and principles described above for avoiding undesired interference phenomena between the adjacent diffraction orders (polarization, wavelength, delay beyond the coherence length or pulse duration) can also be combined in one apparatus. Combining them can in many cases result in advantages in terms of reducing the installation space for the apparatus, increasing the number of diffraction order types, and thus also further reducing interference phenomena.

The proposed method can be utilized in laser processing systems that are equipped with beam shapers 26, 30, 37. The areas of application for the above-described concept for avoiding or time-averaging speckle patterns are numerous. In principle, this method can be used with all known laser processing processes, in particular in micro-scale processing: laser welding, laser polishing, laser ablation, marking, drilling, laser cleaning, etc.

What is claimed is:

1. A method for beam shaping in a laser processing process, comprising:
    in a laser assemblage, focusing a laser beam onto a processing/imaging plane;
    adapting an intensity distribution of the laser beam by way of at least one beam shaper; and
    in order to avoid uniformity defects in the processing/imaging plane, splitting the laser beam by way of at least one beam splitter into at least two partial or individual beams, wherein one of the partial or individual beams are differently influenced and each partial or individual beam is constituted from a laser source having a different wavelength, in such a way that after the partial or individual beams are combined and focused onto the processing/imaging plane, the partial or individual beams form an output beam having an intensity profile, wherein adjacent intensity maxima of the intensity profile differ in terms of at least one or several light properties in order to exclude a formation of interference,
    wherein the intensity profiles of the partial or individual beams are combined in the processing/imaging plane, forming the output beam as a regular pattern having repeating pattern fields in the form of a checkerboard pattern or a honeycomb pattern or a triangular pattern or a diamond pattern or another regular pattern; directly adjacent pattern fields each being associated with a different type of partial or individual beam; the different types of partial or individual beam differing in terms of at least one light property.

2. The method as recited in claim 1, wherein the partial or individual beams are differently influenced, in terms of their phase and/or their intensity profiles and/or their wavelengths, by way of beam shapers and/or delay units and/or wavelength manipulators.

3. The method as recited in claim 2, wherein by way of the beam shapers, the partial beams are sequentially modified at short time intervals using at least one phase and/or amplitude mask.

4. The method as recited in claim 3, wherein different phase and/or amplitude masks are defined for laser processing as a function of a target beam profile.

5. The method as recited in claim 3, wherein the partial beams are modified, each separately or together, using the phase and/or amplitude masks.

6. The method as recited in claim 1, wherein the laser beam is split into at least two differently polarized partial beams; and the partial beams are each modified by way of beam shapers in terms of their intensity profiles; and after the differently polarized partial beams are combined, the intensity profiles of the two partial beams are superimposed on one another in the processing/imaging plane to yield the target beam profile, adjacent intensity maxima of the intensity profiles each having a different polarization.

7. The method as recited in claim 1, wherein diffractive diffusers that are embodied as spatial light modulators are used for beam shaping.

8. The method as recited in claim 1, wherein a pulsed or non-pulsed coherent light source is used.

9. The method as recited in claim 1, wherein when pulsed lasers are used, the laser beam, after being split into at least two partial or individual beams having different intensity profiles for each partial beam, are time-delayed by way of the delay units differently for each partial or individual beam and, after they are combined and focused onto the processing/imaging plane, form an output beam having an intensity profile without superimposition in the processing/imaging plane at least in terms of time, such that in order to generate the different intensity profiles for each partial beam, the beam shaper can be combined with the beam splitter or can be placed after the delay units before a beam combining system.

10. The method as recited in claim 9, wherein the minimum delay is selected to be longer than or equal to a pulse duration of the laser beam.

11. The method as recited in claim 9, wherein no delay is selected for a first partial beam, a delay corresponding to at least the pulse duration of the laser beam is selected for a second partial beam, a delay corresponding to at least twice the pulse duration of the laser beam is selected for a third partial beam, and a delay corresponding to at least (n−1) times the pulse duration of the laser beam is selected for an n-th partial beam.

12. The method as recited in claim 1, wherein the laser beam is split into n partial beams, of which at least one partial beam is varied in terms of a beam shape thereof using the beam shaper, and of which another partial beam or beams is/are combined, without beam shaping, with the at least one beam-shaped partial beam to yield an irradiation field on the workpiece that is to be processed in the processing/imaging plane, or the other partial beams are deliberately caused to interfere.

13. A method for beam shaping in a laser processing process, the method comprising:
in a laser assemblage, focusing a laser beam onto a processing/imaging plane;
adapting an intensity distribution of the laser beam by way of at least one beam shaper; and
in order to avoid uniformity defects in the processing/imaging plane, splitting the laser beam by way of at least one beam splitter into at least two partial or individual beams, wherein one of the partial or individual beams are differently influenced and each partial or individual beam is constituted from a laser source having a different wavelength, in such a way that after the partial or individual beams are combined and focused onto the processing/imaging plane, the partial or individual beams form an output beam having an intensity profile, wherein adjacent intensity maxima of the intensity profile differ in terms of at least one or several light properties in order to exclude a formation of interference, wherein the method is used in laser processing systems for laser ablation, laser drilling, laser marking, laser soldering and laser welding, laser cutting, laser sintering and hardfacing, laser cleaning, laser hardening, laser remelting, laser alloying and dispersing, or laser polishing.

14. An apparatus, comprising:
a computer unit;
a laser source; and
a beam shaper, wherein a laser beam from the laser source is focusable onto a processing/imaging plane, wherein the laser beam is adaptable in terms of an intensity distribution thereof by way of the beam shaper;
an arrangement for focusing a laser beam onto a processing/imaging plane;
an arrangement for adapting an intensity distribution of the laser beam by way of the beam shaper; and
in order to avoid uniformity defects in the processing/imaging plane, an arrangement for splitting the laser beam by way of at least one beam splitter into at least two partial or individual beams, wherein one of the partial or individual beams are differently influenced and each partial or individual beam is constituted from a second laser source having a different wavelength, in such a way that after the partial or individual beams are combined and focused onto the processing/imaging plane, the partial or individual beams form an output beam having an intensity profile, wherein adjacent intensity maxima of the intensity profile differ in terms of at least one or several light properties in order to exclude a formation of interference, wherein the laser beam is splittable by way of the at least one beam splitter into the partial or individual beams or each partial or individual beam is generatable from the laser source having a different wavelength, wherein by way of the beam shaper and/or delay units and/or wavelength manipulators that can be addressable by the computer unit, the partial or individual beams are influenceable differently in terms of phase, polarization, wavelength, and/or intensity profiles thereof, wherein after the partial or individual beams are combined using a beam combining system and are focused onto the processing/imaging plane, an output beam having an intensity profile is formable, wherein adjacent intensity maxima of the intensity profile differ in terms of at least one or several light properties in order to rule out an occurrence of interference.

15. The apparatus as recited in claim 14, wherein the apparatus is a laser assemblage for material processing.

* * * * *